US010630101B2

(12) United States Patent
Hsieh et al.

(10) Patent No.: US 10,630,101 B2
(45) Date of Patent: Apr. 21, 2020

(54) CHARGING-DISCHARGING MODULE OF ENERGY STORAGE UNIT AND CHARGING-DISCHARGING METHOD THEREOF

(71) Applicant: ASUSTeK COMPUTER INC., Taipei (TW)

(72) Inventors: Chang-Lin Hsieh, Taipei (TW); Yi-Ming Huang, Taipei (TW); Chien-Chung Lo, Taipei (TW); Wei-Chen Tu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 77 days.

(21) Appl. No.: 15/684,985

(22) Filed: Aug. 24, 2017

(65) Prior Publication Data

US 2018/0069428 A1    Mar. 8, 2018

(30) Foreign Application Priority Data

Sep. 7, 2016   (TW) .............................. 105128971 A

(51) Int. Cl.
*H02J 7/00*  (2006.01)
*H02J 7/36*  (2006.01)

(52) U.S. Cl.
CPC .............. *H02J 7/36* (2013.01); *H02J 7/0019* (2013.01); *H02J 7/0063* (2013.01); *H02J 7/0068* (2013.01); *H02J 7/0073* (2013.01); *H02J 7/0077* (2013.01)

(58) Field of Classification Search
CPC .......... H02J 7/36; H02J 7/0019; H02J 7/0073; H02J 7/0068; H02J 7/0063

USPC ......................................................... 320/136
See application file for complete search history.

(56) References Cited

U.S. PATENT DOCUMENTS

| 4,851,756 A | * | 7/1989 | Schaller | ................ H02J 7/0024 320/126 |
| 5,270,946 A | * | 12/1993 | Shibasaki | ................ G06F 1/263 307/66 |
| 5,369,351 A | * | 11/1994 | Adams | .................... A61N 1/378 320/121 |
| 5,576,608 A | * | 11/1996 | Nagai | .................... H02J 7/0019 320/159 |

(Continued)

FOREIGN PATENT DOCUMENTS

| CN | 1797893 A | 7/2006 |
| CN | 103199596 A | 7/2013 |
| WO | WO-2016062284 A1 * | 4/2016 .......... B60L 11/1862 |

*Primary Examiner* — Robert Grant
*Assistant Examiner* — John T Trischler
(74) *Attorney, Agent, or Firm* — McClure, Qualey & Rodack, LLP

(57) ABSTRACT

A charging-discharging module of the energy storage unit is provided. The charging-discharging module of the energy storage unit includes a first energy storage unit; a second energy storage unit; a first switching unit electrically connected to a first terminal of the second energy storage unit; a selecting circuit electrically connected to a first terminal of the first energy storage unit and the first switching unit to selectively conduct the first energy storage unit or the second energy storage unit to a system circuit; and a processing unit electrically connected to the first switching unit. A charging and discharging method is also provided.

11 Claims, 10 Drawing Sheets

(56) References Cited

U.S. PATENT DOCUMENTS

| | | | | |
|---|---|---|---|---|
| 5,637,981 | A * | 6/1997 | Nagai | H02J 7/0019 320/116 |
| 5,644,208 | A * | 7/1997 | Abiven | H02J 7/0024 320/118 |
| 6,204,633 | B1 * | 3/2001 | Kitagawa | H02J 7/0068 320/128 |
| 6,265,847 | B1 * | 7/2001 | Goerke | H02J 7/0024 320/126 |
| 6,268,710 | B1 * | 7/2001 | Koga | H02J 7/0021 320/116 |
| 6,320,351 | B1 * | 11/2001 | Ng | H02J 7/0032 320/104 |
| 6,323,623 | B1 * | 11/2001 | Someya | H02J 7/0021 320/121 |
| 6,522,902 | B2 * | 2/2003 | Nishihara | H01M 10/4207 320/117 |
| 6,580,249 | B2 * | 6/2003 | Yau | H02J 7/0022 320/122 |
| 7,151,378 | B2 * | 12/2006 | Valenta, Jr. | A61N 1/378 324/426 |
| 7,456,610 | B2 * | 11/2008 | Yamashita | H02J 7/0016 320/116 |
| 7,545,118 | B2 * | 6/2009 | Kim | G06F 1/26 320/128 |
| 7,545,121 | B2 * | 6/2009 | Bolduc | H02J 7/1423 320/104 |
| 7,638,898 | B2 * | 12/2009 | Peter | H02J 7/0024 307/48 |
| 7,728,545 | B2 * | 6/2010 | Kanouda | H01M 10/441 320/101 |
| RE41,676 | E * | 9/2010 | Yau | H02J 7/0022 320/119 |
| 7,915,859 | B2 * | 3/2011 | Kim | H02J 7/0019 320/126 |
| 7,962,212 | B2 * | 6/2011 | Signoff | A61N 1/378 320/121 |
| 8,013,574 | B2 * | 9/2011 | Naganuma | B60L 11/1861 320/118 |
| 8,030,798 | B2 * | 10/2011 | Seligman | H02J 7/0024 307/48 |
| 8,294,421 | B2 * | 10/2012 | Bucur | H02J 7/0019 320/116 |
| 8,330,418 | B2 * | 12/2012 | Furukawa | H02J 7/0018 320/118 |
| 8,334,674 | B2 * | 12/2012 | Kim | H01M 10/4207 320/124 |
| 8,427,098 | B2 * | 4/2013 | Moore | H02J 7/0013 307/46 |
| 8,441,228 | B2 * | 5/2013 | Brabec | B60L 11/1861 180/65.21 |
| 8,502,502 | B2 * | 8/2013 | Huang | H01M 2/204 320/116 |
| 8,547,065 | B2 * | 10/2013 | Trigiani | H02J 7/0018 320/119 |
| 8,571,733 | B2 * | 10/2013 | Yamamoto | B60L 3/0046 701/22 |
| 8,588,913 | B2 * | 11/2013 | Signoff | A61N 1/378 320/121 |
| 8,643,325 | B2 * | 2/2014 | Yang | H02J 7/0024 320/107 |
| 8,643,334 | B2 * | 2/2014 | Kuo | H02J 7/0019 320/116 |
| 8,793,041 | B2 * | 7/2014 | Yamamoto | B60W 20/13 701/22 |
| 8,803,479 | B2 * | 8/2014 | Kim | H01M 10/4207 320/126 |
| 8,860,371 | B2 * | 10/2014 | Yang | H02J 7/0024 320/113 |
| 8,896,155 | B2 * | 11/2014 | Oga | H01M 10/482 307/71 |
| 9,102,241 | B2 * | 8/2015 | Brabec | B60L 11/1861 |
| 9,160,179 | B2 * | 10/2015 | Someya | H02J 7/00 |
| 9,166,419 | B2 * | 10/2015 | Girard | B60L 11/1864 |
| 9,199,543 | B2 * | 12/2015 | Brabec | B60L 11/1861 |
| 9,385,542 | B2 * | 7/2016 | Chang | H02J 7/0019 |
| RE46,156 | E * | 9/2016 | Moore | H02J 7/0013 |
| 9,564,763 | B2 * | 2/2017 | Finberg | H02J 7/0016 |
| 9,590,443 | B2 * | 3/2017 | Ju | H02J 7/022 |
| 9,673,658 | B2 * | 6/2017 | Jeong | H02J 7/0018 |
| 9,694,697 | B2 * | 7/2017 | Brabec | B60L 11/1861 |
| 9,722,435 | B2 * | 8/2017 | Park | H02J 7/0016 |
| 9,948,217 | B2 * | 4/2018 | Chuang | B60L 58/21 |
| 10,008,862 | B2 * | 6/2018 | Takizawa | H01M 10/441 |
| 2003/0042870 | A1 * | 3/2003 | Yau | H02J 7/0022 320/117 |
| 2003/0090239 | A1 * | 5/2003 | Sakakibara | H02J 7/0042 320/166 |
| 2005/0001593 | A1 * | 1/2005 | Kawasumi | H02J 7/0013 320/132 |
| 2005/0170245 | A1 * | 8/2005 | Vartak | H01M 10/42 429/209 |
| 2006/0103353 | A1 * | 5/2006 | Kim | G06F 1/26 320/128 |
| 2008/0030165 | A1 * | 2/2008 | Lisac | H02M 3/158 320/103 |
| 2008/0169785 | A1 * | 7/2008 | Kim | H01M 10/4207 320/124 |
| 2008/0211451 | A1 * | 9/2008 | Zhang | H01L 31/02021 320/101 |
| 2009/0102422 | A1 * | 4/2009 | Naganuma | B60L 11/1861 320/118 |
| 2009/0115372 | A1 * | 5/2009 | Naganuma | B60L 11/1861 320/136 |
| 2010/0013442 | A1 * | 1/2010 | Yamazaki | H01M 10/44 320/162 |
| 2011/0305933 | A1 * | 12/2011 | Huang | H01M 2/1022 429/97 |
| 2012/0074894 | A1 * | 3/2012 | Chen | B60L 11/005 320/103 |
| 2012/0169129 | A1 | 7/2012 | Kim et al. | |
| 2012/0235641 | A1 * | 9/2012 | Yang | H02J 7/0024 320/110 |
| 2012/0249071 | A1 * | 10/2012 | Yang | H02J 7/0024 320/110 |
| 2012/0262121 | A1 * | 10/2012 | Kuo | H02J 7/0018 320/126 |
| 2013/0076519 | A1 * | 3/2013 | Tang | H02J 7/0019 340/636.15 |
| 2013/0099747 | A1 * | 4/2013 | Baba | H02J 7/0014 320/118 |
| 2013/0169228 | A1 * | 7/2013 | Yang | H02J 7/0016 320/110 |
| 2013/0249219 | A1 * | 9/2013 | Kim | H02J 7/007 290/36 R |
| 2013/0285612 | A1 * | 10/2013 | Okuda | H02J 7/0016 320/126 |
| 2014/0203738 | A1 * | 7/2014 | Yamazaki | B60L 11/1809 318/139 |
| 2015/0002073 | A1 * | 1/2015 | Ju | H02J 7/022 320/103 |
| 2015/0042282 | A1 * | 2/2015 | Oga | H01M 10/482 320/118 |
| 2015/0088253 | A1 * | 3/2015 | Doll | A61F 2/1624 623/6.22 |
| 2015/0194707 | A1 * | 7/2015 | Park | H01M 10/4207 429/50 |
| 2015/0340897 | A1 * | 11/2015 | Uan-Zo-Li | H02J 7/0054 320/103 |
| 2015/0380959 | A1 * | 12/2015 | Chang | H02J 7/0019 320/118 |
| 2016/0023571 | A1 * | 1/2016 | Wu | B60L 11/1864 320/103 |
| 2016/0043579 | A1 * | 2/2016 | Finberg | H02J 7/0016 320/116 |
| 2016/0049814 | A1 * | 2/2016 | Sugiyama | H02J 7/0021 320/128 |
| 2016/0190847 | A1 * | 6/2016 | Han | H02J 1/10 320/134 |

(56) References Cited

U.S. PATENT DOCUMENTS

| | | | |
|---|---|---|---|
| 2016/0380445 A1* | 12/2016 | He | H02J 7/0019 |
| | | | 320/107 |
| 2017/0232851 A1* | 8/2017 | Unno | H02J 7/0054 |
| | | | 307/10.1 |
| 2018/0309172 A1* | 10/2018 | Ito | H01M 10/443 |
| 2019/0165713 A1* | 5/2019 | Namuduri | H02P 27/06 |

* cited by examiner

CHARGING-DISCHARGING MODULE OF ENERGY STORAGE UNIT AND CHARGING-DISCHARGING METHOD THEREOF

CROSS-REFERENCE TO RELATED APPLICATION

This application claims the priority benefit of Taiwan application serial No. 105128971, filed on Sep. 7, 2016. The entirety of the above-mentioned patent application is hereby incorporated by references herein and made a part of specification.

BACKGROUND OF THE INVENTION

Field of the Invention

The disclosure relates to a charging-discharging module of an energy storage unit and, more specifically, to a charging-discharging module of an energy storage unit which is capable to switch in charge and discharge modes.

Description of the Related Art

With the improvement of energy efficiency of various mobile electronic devices, quick charge and discharge circuit topologies are available to shorten the time for charging/discharging a battery of the electronic device.

In a circuit topology with a single battery, improving charging speed may increase voltage or current and that causes the circuit heating up, thus the charge efficiency is low. In some circuits, batteries connected in series are used to improve the charge efficiency. However, in such a configuration, a converter is needed that causes to reduce the discharge efficiency.

BRIEF SUMMARY OF THE INVENTION

According to a first aspect of the disclosure, a charging-discharging module of the energy storage unit is provided. The charging-discharging module of the energy storage unit comprise: a first energy storage unit; a second energy storage unit; a first switching unit electrically connected to a first terminal of the second energy storage unit; a selecting circuit electrically connected to a first terminal of the first energy storage unit and the first switching unit to selectively conduct the first energy storage unit or the second energy storage unit to a system circuit; and a processing unit electrically connected to the first switching unit. In a discharge mode, when an across voltage of the first energy storage unit is larger than the across voltage of the second energy storage unit, the processing unit is configured to turn off the first switching unit to allow the first energy storage unit to supply power to the system circuit. When the across voltage of the second energy storage unit is larger than the across voltage of the first energy storage unit, the processing unit is configured to turn on the first switching unit to allow the second energy storage unit to supply power to the system circuit.

According to a second aspect of the disclosure, a charging and discharging method adapted to a charging-discharging module of an energy storage unit is provided. The charging and discharging method comprises: comparing an across voltage of a first energy storage unit with an across voltage of a second energy storage unit in a discharge mode of the charging-discharging module of the energy storage unit; turning off a first switching unit via a processing unit to allow the first energy storage unit to supply power to a system circuit via a selecting circuit when the across voltage of the first energy storage unit is larger than the across voltage of the second energy storage unit; and turning on the first switching unit via the processing unit to allow the second energy storage unit to supply power to the system circuit via the selecting circuit when the across voltage of the second energy storage unit is larger than the across voltage of the first energy storage unit.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

In the disclosure, when it is described that a component is connected/coupled, the term "connect/couple" refers to "electrically connected/coupled (to)" or the cooperation/interacting relationship between two or more components. Additionally, the terms "first", "second" and the like are used to distinguish elements/operations that have the same technical terms, but not refer to any special item or imply any sequence unless expressly stated.

Figure 1:
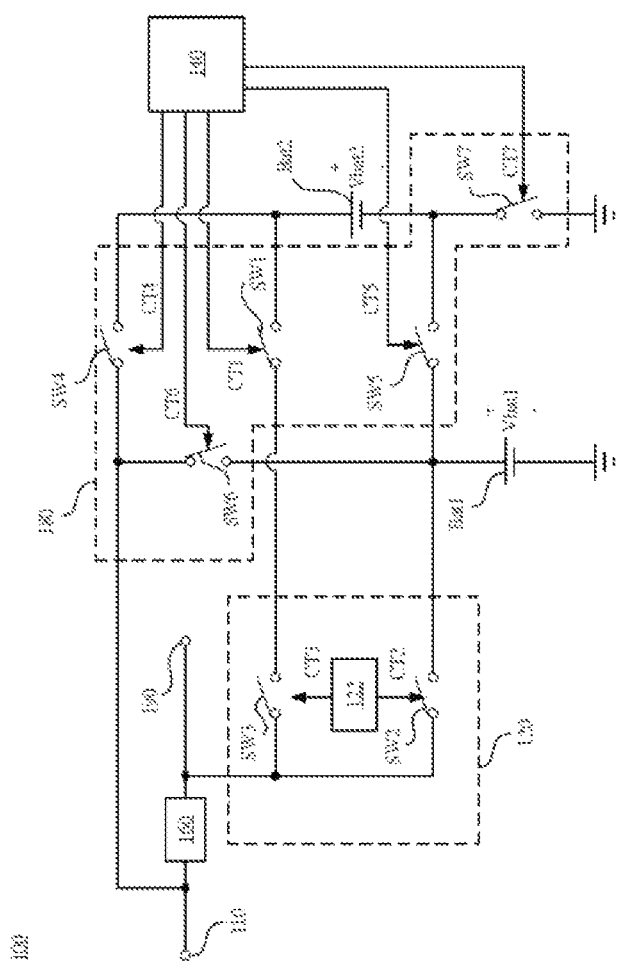
FIG. 1 is a schematic diagram showing a charging-discharging module of an energy storage unit in an embodiment.

Please refer to FIG. 1. FIG. 1 is a schematic diagram showing a charging-discharging module of the energy storage unit 100 in an embodiment. In an embodiment, a charging-discharging module of the energy storage unit 100 includes a battery. The battery is charged via an external charger to supply power to a system circuit. In an embodiment, the charging-discharging module of the energy storage unit 100 is used in a variety of electronic devices, such as smart phones, tablet computers.

As shown in FIG. 1, in the embodiment, the charging-discharging module of the energy storage unit 100 includes energy storage units Bat1 and Bat2, a selecting circuit 120, a processing unit 140, a charging circuit 160 and a switching circuit 180. In an embodiment, the energy storage units Bat1 and Bat2 are batteries. In the embodiment, the selecting circuit 120 includes a controller 122 and switching units SW2 and SW3. The switching circuit 180 includes switching units SW1 and SW4 to SW7.

An input terminal 110 of the charging-discharging module of the energy storage unit 100 is electrically connected to the charging circuit 160 and the switching circuit 180. In the embodiment, the input terminal 110 of the charging-discharging module of the energy storage unit 100 is electrically connected to an input terminal of the charging circuit 160, a first terminal of the switching unit SW6 of the switching circuit 180, and a first terminal of the switching unit SW4 of the switching circuit 180.

An output terminal 190 of the charging-discharging module of the energy storage unit 100 is electrically connected to the charging circuit 160 and the selecting circuit 120. In the embodiment, the output terminal 190 of the charging-discharging module of the energy storage unit 100 is electrically connected to an output terminal of the charging circuit 160, a first terminal of the switching unit SW2 of the selecting circuit 120, and a first terminal of the switching unit SW3 of the selecting circuit 120.

The selecting circuit 120 is electrically connected to a first terminal of the energy storage unit Bat1 and the switching unit SW1 of the switching circuit 180, thus to selectively conduct the energy storage unit Bat1 or the energy storage unit Bat2 with the system circuit. A second terminal of the switching unit SW2 of the selecting circuit 120 is electrically connected to the first terminal of the energy storage unit Bat1, a second terminal of the switching unit SW6 and a first terminal of the switching unit SW5 of the switching circuit 180. A second terminal of the switching unit SW3 of the selecting circuit 120 is electrically connected to the switching unit SW1 of the switching circuit 180. The controller 122 of the selecting circuit 120 is electrically connected to control terminals of the switching units SW2 and SW3 to output control signals CT2 and CT3 to the switching units SW2 and SW3, respectively, for turning on or off.

The processing unit 140 is electrically connected to the control terminals of the switching units SW1 and SW4 to SW7 in the switching circuit 180. The processing unit 140 outputs control signals CT1 and CT4 to CT7 to the switching units SW1 and SW4 to SW7, respectively, for turning on or off.

As shown in FIG. 1, the switching unit SW1 is electrically connected to the energy storage unit Bat2.

In the embodiment, the switching unit SW4 electronically connects the input terminal 110 and the first terminal of the energy storage unit Bat2. The switching unit SW5 electronically connects the second terminal of the energy storage unit Bat2 and the first terminal of the energy storage unit Bat1. The switching unit SW6 electronically connects the input terminal 110 and the first terminal of the energy storage unit Bat1. The switching unit SW7 electronically connects the second terminal of the energy storage unit Bat2 and a ground terminal.

When the switching circuit 180 turns on or off the switching units SW1 and SW4 to SW7, the energy storage units Bat1 and Bat2 are set to be charged in a charge mode or supply power to the system circuit in a discharge mode accordingly.

Figure 2A:
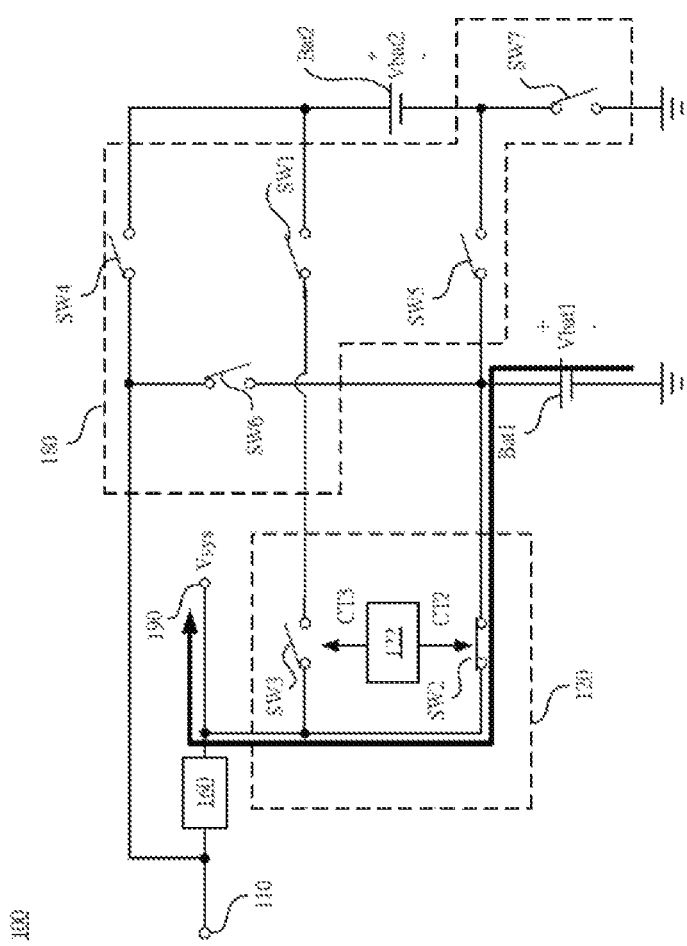
FIG. 2A and FIG. 2B are schematic diagrams showing a discharge mode in an embodiment.
Figure 2B:
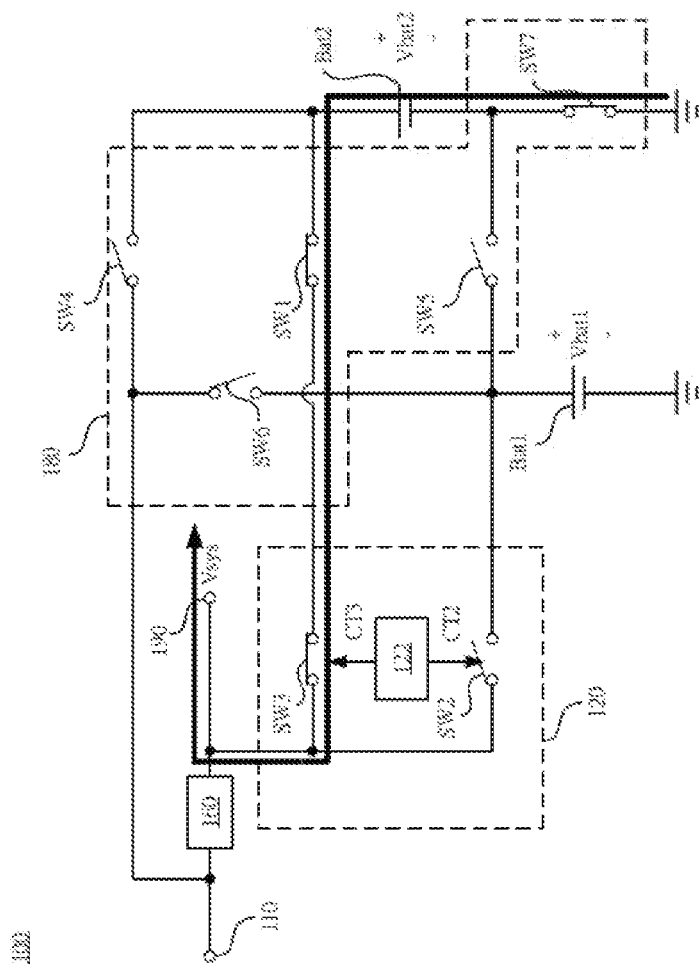

Please refer to FIG. 2A and FIG. 2B. FIG. 2A and FIG. 2B are schematic diagrams showing a discharge mode in an embodiment. In the FIG. 2A and FIG. 2B, the component that is the same or similar to that in FIG. 1 is denoted by the same reference symbol. Details for the same or similar component(s) is described above, which is not repeated hereinafter.

In an embodiment, in a discharge mode, the processing unit 140 and the controller 122 of the selecting circuit 120 are configured to compare an across voltage Vbat1 of the energy storage unit Bat1 with an across voltage Vbat2 of the energy storage unit Bat2 via a voltage detecting unit. And then a higher level of the energy storage unit Bat1 or Bat2 is selected to supply power to the system circuit for balancing the levels of the energy storage units Bat1 and Bat2.

In an embodiment, as shown in FIG. 2A, when the across voltage Vbat1 of the energy storage unit Bat1 is larger than the across voltage Vbat2 of the energy storage unit Bat2, the processing unit 140 is configured to turn off the switching unit SW1 to allow the energy storage unit Bat1 to supply power to the system circuit with an output system voltage Vsys. In an embodiment, the switching units SW4 to SW7 in the switching circuit 180 are also turned off. At the time, the controller 122 of the selecting circuit 120 is configured to output the control signals CT2 and CT3 to turn on the switching unit SW2 and turn off the switching unit SW3, respectively. The energy storage unit Bat1 is electronically connected to the output terminal 190 via the switching unit SW2 of the selecting circuit 120 to output the system voltage Vsys to the system circuit.

As shown in FIG. 2B, when the across voltage Vbat2 of the energy storage unit Bat2 is larger than the across voltage Vbat1 of the energy storage unit Bat1, the processing unit 140 is configured to turn on the switching unit SW1 to allow the energy storage unit Bat2 to supply power to the system circuit with the output system voltage Vsys. In an embodiment, the switching unit SW7 of the switching circuit 180 is turned on. The switching units SW4 to SW6 is kept off. The controller 122 of the selecting circuit 120 is configured to output the control signals CT2 and CT3 to turn off the switching unit SW2 and to turn on the switching unit SW3, respectively. The energy storage unit Bat2 is electronically connected to the output terminal 190 via the switching unit SW1 and the switching unit SW3 of the selecting circuit 120 to output the system voltage Vsys to the system circuit.

In such a way, the charging-discharging module of the energy storage unit 100 provides power to the system circuit via the energy storage unit Bat1 and Bat2, alternatively, for balancing the levels of the energy storage unit Bat1 and Bat2 and avoiding the large level difference between the energy storage units Bat1 and Bat2 which is caused by continuous discharge of one of the energy storage units Bat1 and Bat2.

As shown in FIG. 2A and FIG. 2B, in the embodiment, the energy storage units Bat1 and Bat2 do not need any additional step-down converter circuit to output the system voltage Vsys, which improves the whole system efficiency.

Figure 3A:
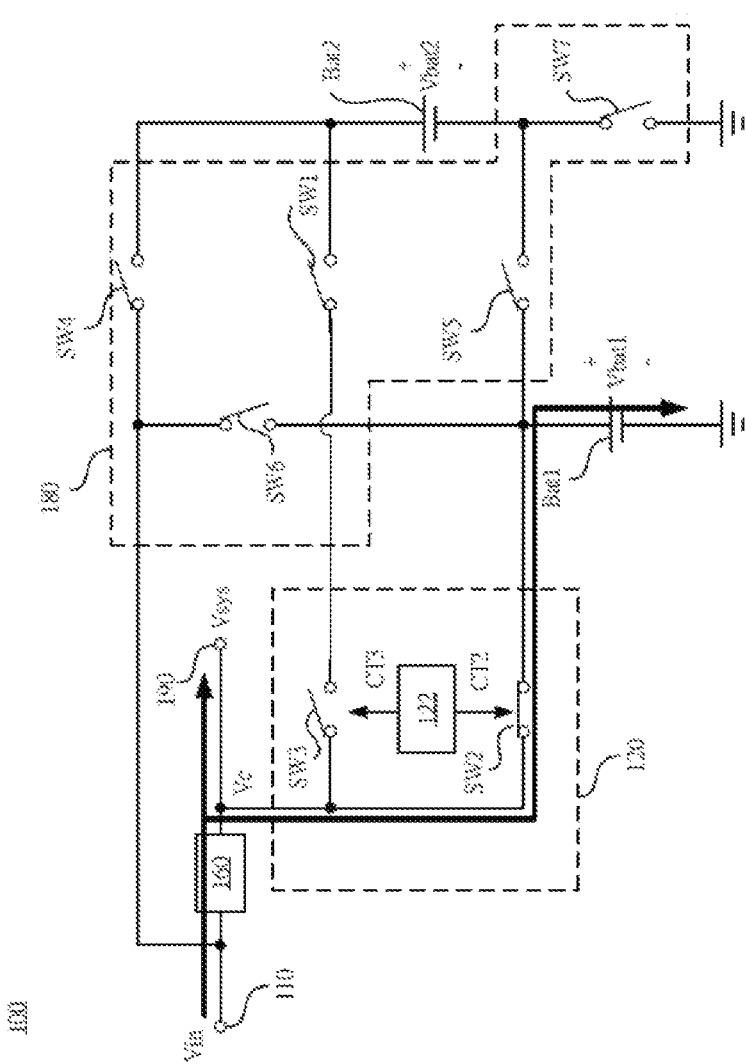
FIG. 3A and FIG. 3B are schematic diagrams showing a normal charge mode in an embodiment.
Figure 3B:
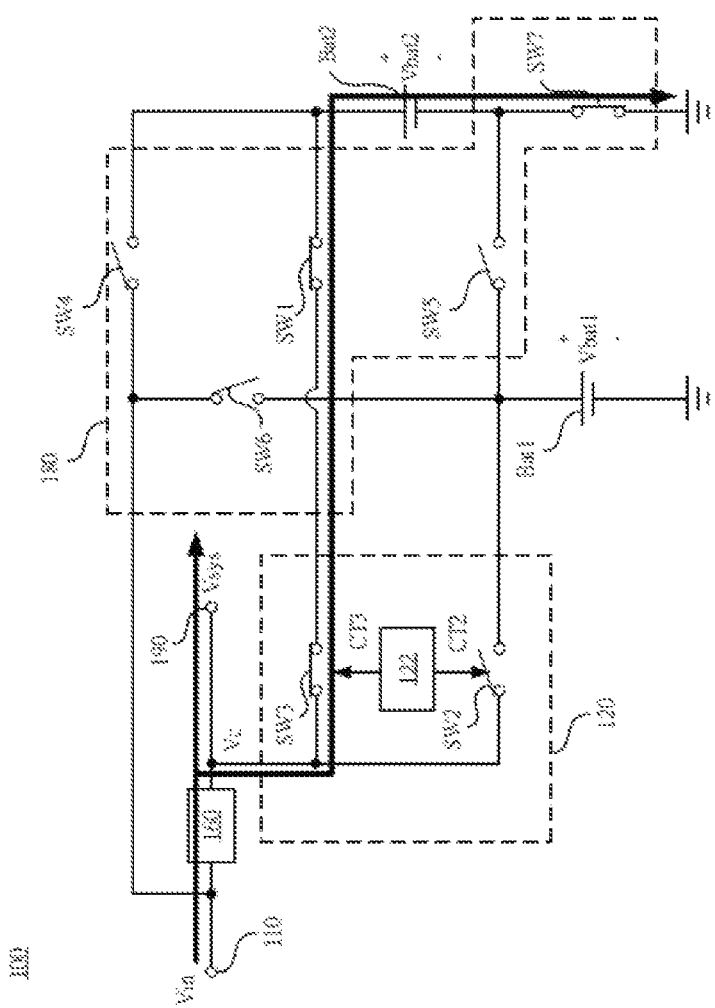

Please refer to FIG. 3A and FIG. 3B. FIG. 3A and FIG. 3B are schematic diagrams showing a normal charge mode in an embodiment. Details for the normal charge mode are described by reference to FIG. 1, FIG. 3A and FIG. 3B, which is not limited herein. In FIG. 3A and FIG. 3B, the component the same or similar to that in FIG. 1, FIG. 2A and FIG. 2B is denoted by the same reference symbol. Details for the same or similar component are described above, which is not repeated hereinafter.

In an embodiment, when the electronic device is charged via an external charger, the charging-discharging module of the energy storage unit 100 detects whether the charger supports a direct-charge mode via a detecting circuit. When the charger does not support the direct-charge mode, the charging-discharging module of the energy storage unit 100 operates in the normal charge mode to charge the energy storage units Bat1 and Bat2 via the charging circuit 160.

In the normal charge mode, the charging circuit 160 receives an input voltage Vin from the input terminal 110 and converts the input voltage Vin to a charging voltage Vc to charge the energy storage units Bat1 and Bat2. As shown in FIG. 3A and FIG. 3B, in an embodiment, the charging voltage Vc output by the charging circuit 160 is directly used as the system voltage Vsys. The charging circuit 160 outputs the charging voltage Vc to the output terminal 190 of the charging-discharging module of the energy storage unit 100 to provide power to the system circuit.

Similar to the discharge mode, in the charge mode, the processing unit 140 and the controller 122 of the selecting circuit 120 are configured to compare the across voltage Vbat1 of the energy storage unit Bat1 with the across voltage Vbat2 of the energy storage unit Bat2 via the voltage detecting unit. Then, the charging voltage Vc is output to charge one of the energy storage unit Bat1 or Bat2 with a lower voltage level via the selecting circuit 120 and the switching circuit 180 for balancing the levels of the energy storage units Bat1 and Bat2.

As shown in FIG. 3A, when the across voltage Vbat1 of the energy storage unit Bat1 is lower than the across voltage Vbat2 of the energy storage unit Bat2, the processing unit 140 is configured to turn off the switching unit SW1 to allow the charging voltage Vc to charge the energy storage unit Bat1 via the selecting circuit 120. In an embodiment, the switching units SW1 and SW4 to SW7 of the switching circuit 180 are turned off. The controller 122 of the selecting circuit 120 outputs the control signals CT2 and CT3 to turn on the switching unit SW2 and to turn off the switching unit SW3, respectively. The energy storage unit Bat1 is electronically connected to the charging circuit 160 via the switching unit SW2 of the selecting circuit 120 to receive the charging voltage Vc.

As shown in FIG. 3B, when the across voltage Vbat2 of the energy storage unit Bat2 is lower than the across voltage Vbat1 of the energy storage unit Bat1, the processing unit 140 is configured to turn on the switching unit SW1 to allow the charging voltage Vc to charge the energy storage unit Bat2 via the selecting circuit 120 and the switching unit SW1. In an embodiment, the switching unit SW7 of the switching circuit 180 is turned on. The switching units SW4 to SW6 of the switching circuit 180 are kept off. At the time, the controller 122 of the selecting circuit 120 outputs the control signals CT2 and CT3 to turn off the switching unit SW2 and to turn on the switching unit SW3, respectively. Thus, the energy storage unit Bat2 is electronically connected to the charging circuit 160 via the switching unit SW3 of the selecting circuit 120 and the switching unit SW1 to receive the charging voltage Vc.

In such a way, the charging-discharging module of the energy storage unit 100 charges the energy storage units Bat1 and Bat2 alternatively to balance the levels of the energy storage units Bat1 and Bat2. In an embodiment, the processing unit 140 is configured to turn on or off the switching unit SW1 alternatively to charge the energy storage unit Bat2 or Bat1 with the received the charging voltage Vc via the selecting circuit 120. Therefore, whether in the charge or discharged mode, the levels of the energy storage units Bat1 and Bat2 are balanced by the charging-discharging module of the energy storage unit 100.

Figure 4:
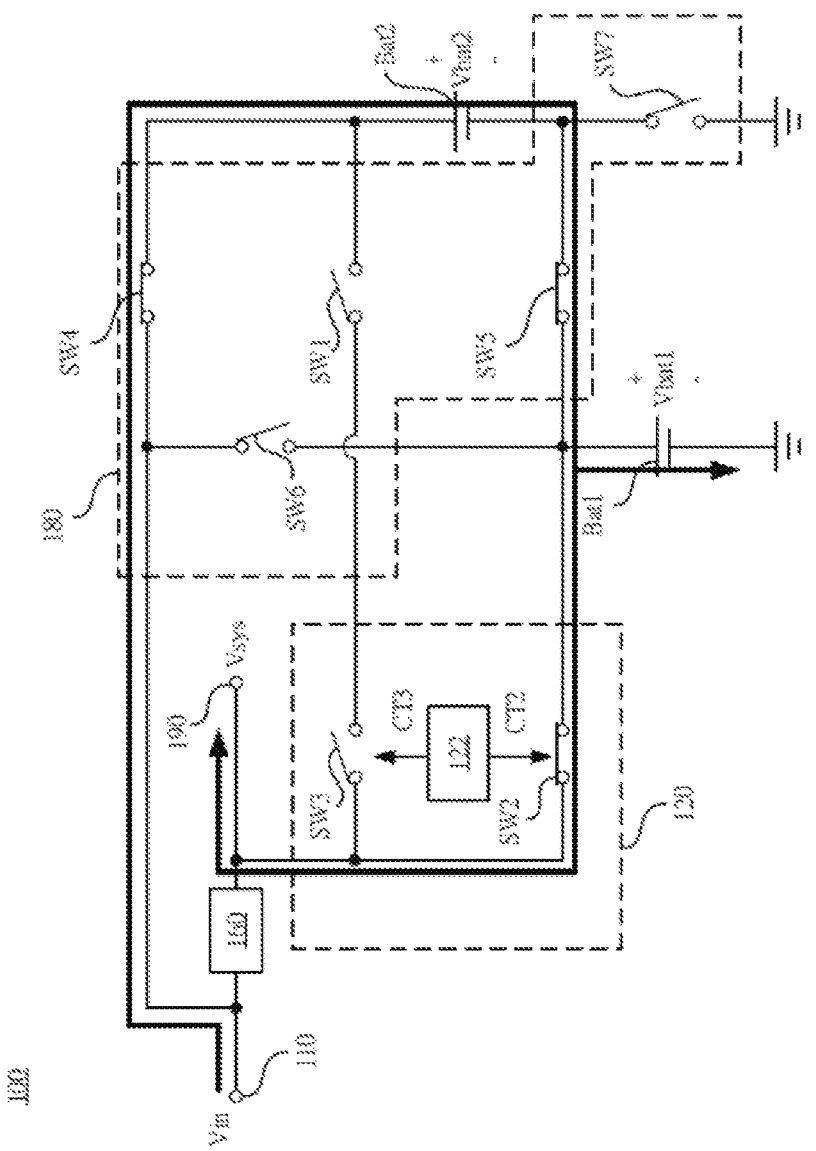
FIG. 4 is a schematic diagram showing a first charge mode in an embodiment.

Please refer to FIG. 4. FIG. 4 is a schematic diagram showing a first charge mode in an embodiment. Details for the first charge mode are described by reference to FIG. 1 and FIG. 4, which are not limited herein. In FIG. 4, the component same or similar to that in FIG. 1, FIG. 2A and FIG. 2B is denoted by the same reference symbol. Details for the same or similar component are described above, which are not repeated hereinafter.

In an embodiment, the charging-discharging module of the energy storage unit 100 detects whether the charger supports the direct-charge mode via the detecting circuit. When the charging-discharging module of the energy storage unit 100 determines that the charger supports the direct-charge mode, the charging-discharging module of the energy storage unit 100 receives the input voltage Vin from the charger via the input terminal 110 to charge the energy storage units Bat1 and Bat2 directly, and does not require to convert voltage via the charging circuit 160. Therefore, the whole energy consumption of the charging-discharging module of the energy storage unit 100 is reduced to improve the charge efficiency.

In an embodiment, the charging-discharging module of the energy storage unit 100 is configured to operate in different direct-charge modes to charge the energy storage units Bat1 and Bat2. As shown in FIG. 4, in an embodiment, in a first charge mode, the charging-discharging module of the energy storage unit 100 is configured to make the energy storage units Bat1 and Bat2 in series connection to charge the energy storage units Bat1 and Bat2 simultaneously.

In the first charge mode, the processing unit 140 is configured to turn on the switching unit SW5 of the switching circuit 180 to make the energy storage unit Bat1 and the energy storage unit Bat2 in series connection. The processing unit 140 is configured to turn on the switching unit SW4 of the switching circuit 180. Thus, the energy storage unit Bat1 and the energy storage unit Bat2 receives the input voltage Vin from the input terminal 110 via the switching unit SW4 and are charged with the input voltage Vin. At the time, the switching units SW1, SW6 and SW7 in the switching circuit 180 are turned off.

In an embodiment, in the first charge mode, the controller 122 of the selecting circuit 120 is configured to output the control signals CT2 and CT3 to turn on the switching unit SW2 and to turn off the switching unit SW3, respectively. Then, the energy storage unit Bat1 is conducted to the system circuit via the selecting circuit 120. The energy storage unit Bat1 outputs the system voltage Vsys via the output terminal 190 to provide power to the system circuit.

In the first charge mode, the energy storage units Bat1 and Bat2 are charged in series connection. Thus, with the same charging power, a higher input voltage Vin and a lower charge current are used to charge. The power consumption of the charge path is reduced due to the lower charge current. The whole efficiency of the charging-discharging module of the energy storage unit 100 is improved. In the first (direct) charge mode, the charger charges the energy storage unit Bat1 and the energy storage unit Bat2 directly, but not via the charging circuit 160, which improves the charge efficiency and reduces the heat generated on the charge path.

In an embodiment, in the direct-charge mode, the charging-discharging module of the energy storage unit 100 charges one of the energy storage units Bat1 and Bat2 when the level difference between the energy storage unit Bat1 and the energy storage unit Bat2 is high for balancing the levels of the energy storage units Bat1 and Bat2.

In an embodiment, in the direct-charge mode, the processing unit 140 and the controller 122 of the selecting circuit 120 are configured to compare the across voltage Vbat1 of the energy storage unit Bat1 with the across voltage Vbat2 of the Bat2 via the voltage detecting unit. When the across voltage Vbat2 of the energy storage unit Bat2 minus the across voltage Vbat1 of the energy storage unit Bat1 is larger than a first preset value, that means, the level of the energy storage unit Bat1 is much lower than the level of the energy storage unit Bat2. In this case, the processing unit 140 is configured to control the charging-discharging module of the energy storage unit 100 to switch from the first charge mode to a second charge mode to charge the energy storage unit Bat1. When the across voltage Vbat1 of the energy storage unit Bat1 minus the across voltage Vbat2 of the energy storage unit Bat2 is larger than a second preset value, that means the level of the energy storage unit Bat2 is much lower than the level of the energy storage unit Bat1. In this case, the processing unit 140 is configured to control the charging-discharging module of the energy storage unit 100 to switch from the first charge mode to a third charge mode to charge the energy storage unit Bat2. Details about the operation that the processing unit 140 is configured to turn on or off the switching units SW1 and SW4 to SW7 in the second charge mode and the third charge mode is described accompanying with the figures hereinafter.

Figure 5A:
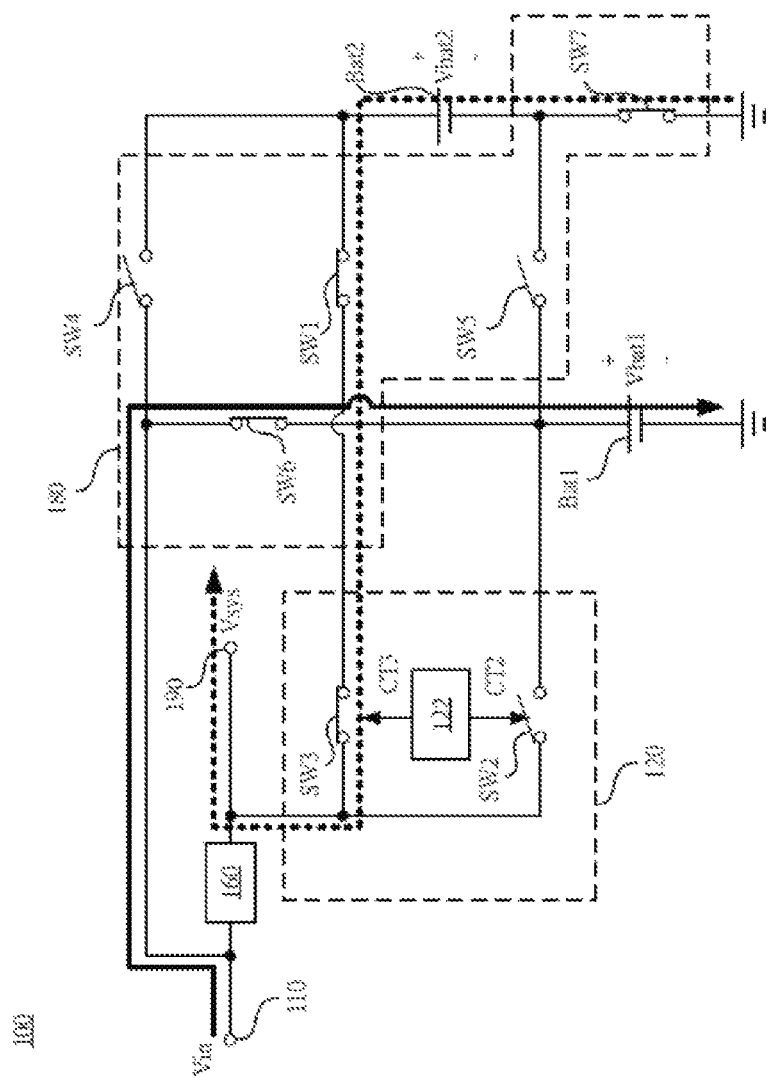
FIG. 5A and FIG. 5B are schematic diagrams showing a second charge mode and a third charge mode, respectively in an embodiment.
Figure 5B:
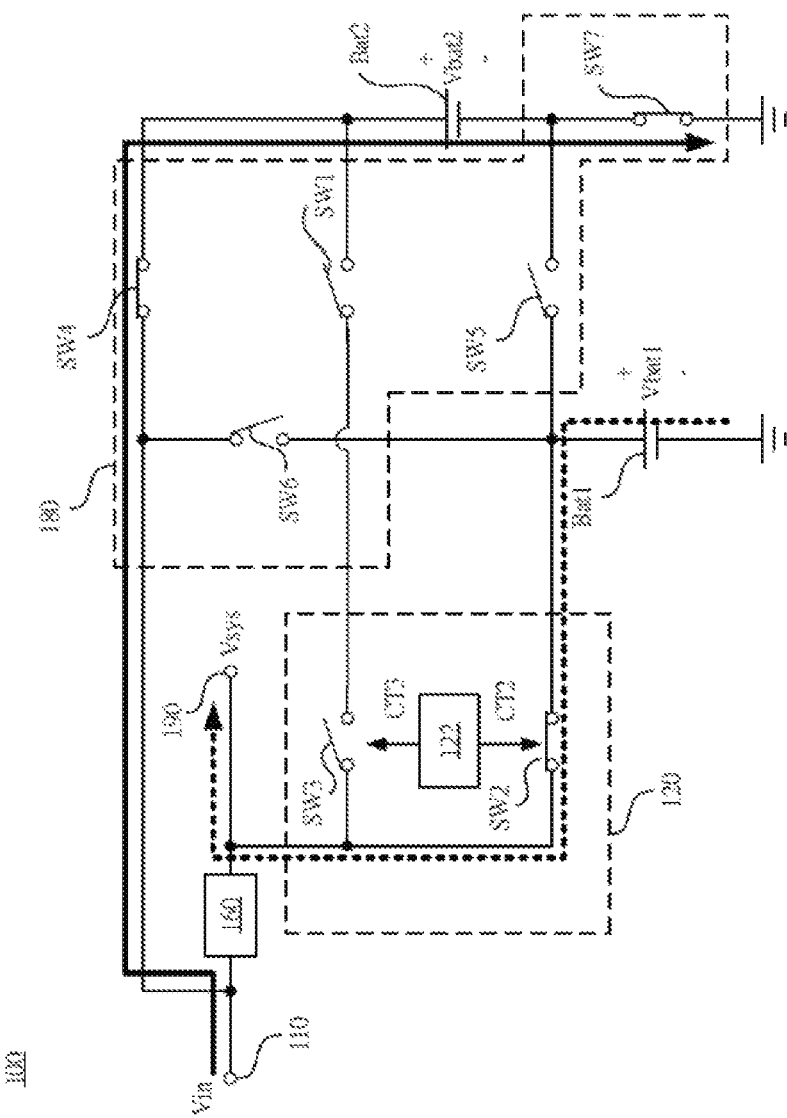

FIG. 5A and FIG. 5B are schematic diagrams showing a second charge mode and a third charge mode, respectively. Details for the second charge mode and the third charge mode are described by reference to FIG. 1, FIG. 5A and FIG. 5B, which is not limited herein. In FIG. 5A and FIG. 5B, the component same or similar to that in FIG. 1, FIG. 4 is denoted by the same reference symbol. Details for the same or similar component are described above, which is not repeated hereinafter.

As shown in FIG. 5A, when the across voltage Vbat2 of the energy storage unit Bat2 minus the across voltage Vbat1 of the energy storage unit Bat1 is larger than the first preset value, the processing unit 140 is configured to control the charging-discharging module of the energy storage unit 100 to switch to the second charge mode to charge the energy storage unit Bat1.

The processing unit 140 is configured to turn on the switching unit SW6. Thus, the energy storage unit Bat1 is electronically connected to the input terminal 110 via the switching unit SW6 to receive the input voltage Vin. The energy storage unit Bat1 is charged with the input voltage Vin. In an embodiment, the switching units SW1 and SW7 in the switching circuit 180 are turned on. The switching unit SW4 and the SW5 in the switching circuit 180 are turned off. The controller 122 of the selecting circuit 120 is configured to output the control signals CT2 and CT3 to turn off the switching unit SW2 and to turn on the switching unit SW3, respectively. Thus, the energy storage unit Bat2 is electronically connected to the output terminal 190 via the switching units SW1 and SW7 and the switching unit SW3 of the selecting circuit 120 to provide the system voltage Vsys to the system circuit. In the second charge mode, the charging-discharging module of the energy storage unit 100 receives the input voltage Vin to charge the energy storage unit Bat1. The energy storage unit Bat2 provides the system voltage Vsys to the system circuit.

As shown in FIG. 5B, when the across voltage Vbat1 of the energy storage unit Bat1 minus the across voltage Vbat2 of the energy storage unit Bat2 is larger than the second preset value, the processing unit 140 is configured to control the charging-discharging module of the energy storage unit 100 to switch to the third charge mode to charge the energy storage unit Bat2.

The processing unit 140 is configured to turn on the switching unit SW4 and SW7. The energy storage unit Bat2 is electronically connected to the input terminal 110 via the switching unit SW4. The energy storage unit Bat2 is electronically connected to the ground terminal via the switching unit SW7. Thus, the energy storage unit Bat2 receives the input voltage Vin and is charged with the input voltage Vin. At the time, the switching units SW1, SW5 and SW6 in the switching circuit 180 are turned off. The controller 122 of the selecting circuit 120 is configured to output the control signals CT2 and CT3 to turn on the switching unit SW2 and to turn off the switching unit SW3, respectively. Thus, the energy storage unit Bat1 is electronically connected to the output terminal 190 via the switching unit SW2 of the selecting circuit 120. The energy storage unit Bat1 provides the system voltage Vsys to the system circuit. In the third charge mode, the charging-discharging module of the energy storage unit 100 receives the input voltage Vin to charge the energy storage unit Bat2. The energy storage unit Bat1 provides the system voltage Vsys to the system circuit.

In such a way, in the direct-charge mode, the charging-discharging module of the energy storage unit 100 is configured to switch among the first charge mode, the second charge mode and the third charge mode to charge the energy storage unit Bat1 and Bat2 in series connection simultaneously, or to charge one of the energy storage units Bat1 and Bat2, according to the current level status of the energy storage units Bat1 and Bat2. When the level difference between the energy storage units Bat1 and Bat2 is large, the charging-discharging module of the energy storage unit 100 operates in the second charge mode or in the third charge mode to charge one of the energy storage units Bat1 and Bat2. Another one of the energy storage units Bat1 and Bat2 provides power to the system circuit. Thus, the levels of the energy storage units Bat1 and Bat2 are balanced. In the second charge mode and the third charge mode, in the operation that the energy storage unit Bat1 or Bat2 receives the input voltage Vin to be charged and the energy storage unit Bat2 or Bat1 outputs the system voltage Vsys not requiring via the converter circuit (such as, the charging circuit 160). Therefore, both the charge operation and the discharge operation are not affected by the conversion efficiency of the converter circuit. Details for the charge and discharge operation are described above, which is not repeated herein.

Figure 6:
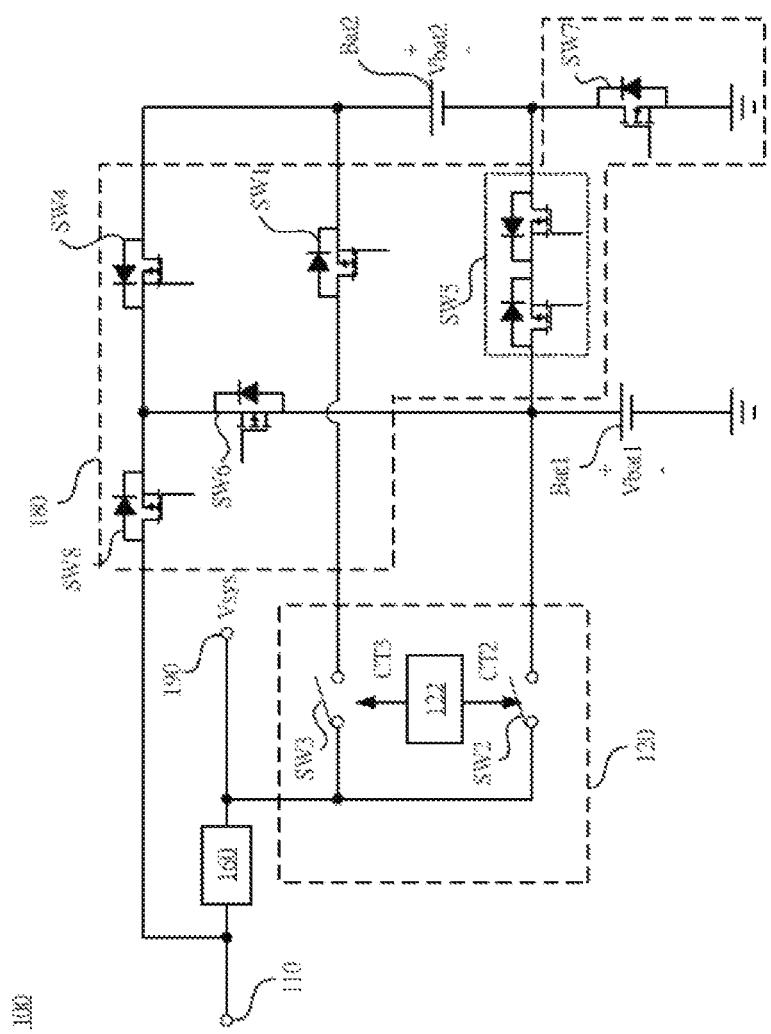
FIG. 6 is a schematic diagram showing a charging-discharging module of an energy storage unit in an embodiment.

Please refer to FIG. 6. FIG. 6 is a schematic diagram showing a charging-discharging module of an energy storage unit 100 in an embodiment. In FIG. 6, the component same or similar to that in FIG. 1 is denoted by the same reference symbol. Details for the same or similar component are described above, which is not repeated hereinafter.

As shown in FIG. 6, in an embodiment, the switching circuit 180 further includes a switching unit SW8. A terminal of the switching unit SW8 is electrically connected to the input terminal 110. Another terminal of the switching unit SW8 is electrically connected to the switching unit SW4 and the switching unit SW6. The switching unit SW8 is turned on when one of the switching unit SW4 and the switching unit SW6 is turned on. Details for the operation are similar to that in the embodiments of FIG. 2 to FIG. 5B, which is not repeated herein.

In an embodiment, the switching units SW1, SW4 to SW8 in the switching circuit 180 are implemented by P-type or N-type Metal-Oxide-Semiconductor Field-Effect Transistors (MOSFET). As shown in FIG. 6, cathodes of body diodes of the switching unit SW4 and the switching unit SW8 are connected. In an embodiment, the cathodes of body diodes of the switching unit SW6 and the switching unit SW8 are connected. Thus, a bidirectional cut-off protection of the circuit is achieved via the connection of the switching unit SW6 and the switching unit SW8 and the connection of the switching unit SW4 and the switching unit SW8.

In an embodiment, any one of the switching units SW1, SW4 to SW8 is implemented by a plurality of MOSFETs. As shown in FIG. 6, the switching unit SW5 includes two transistor switches that are connected with each other. Similarly, the diode cathodes of the transistors in the switching unit SW5 are connected to provide the bidirectional cut-off protection.

In an embodiment, the switching units SW2 and SW3 of the selecting circuit 120 are implemented by P-type or N-type MOSFETs.

Figure 7:
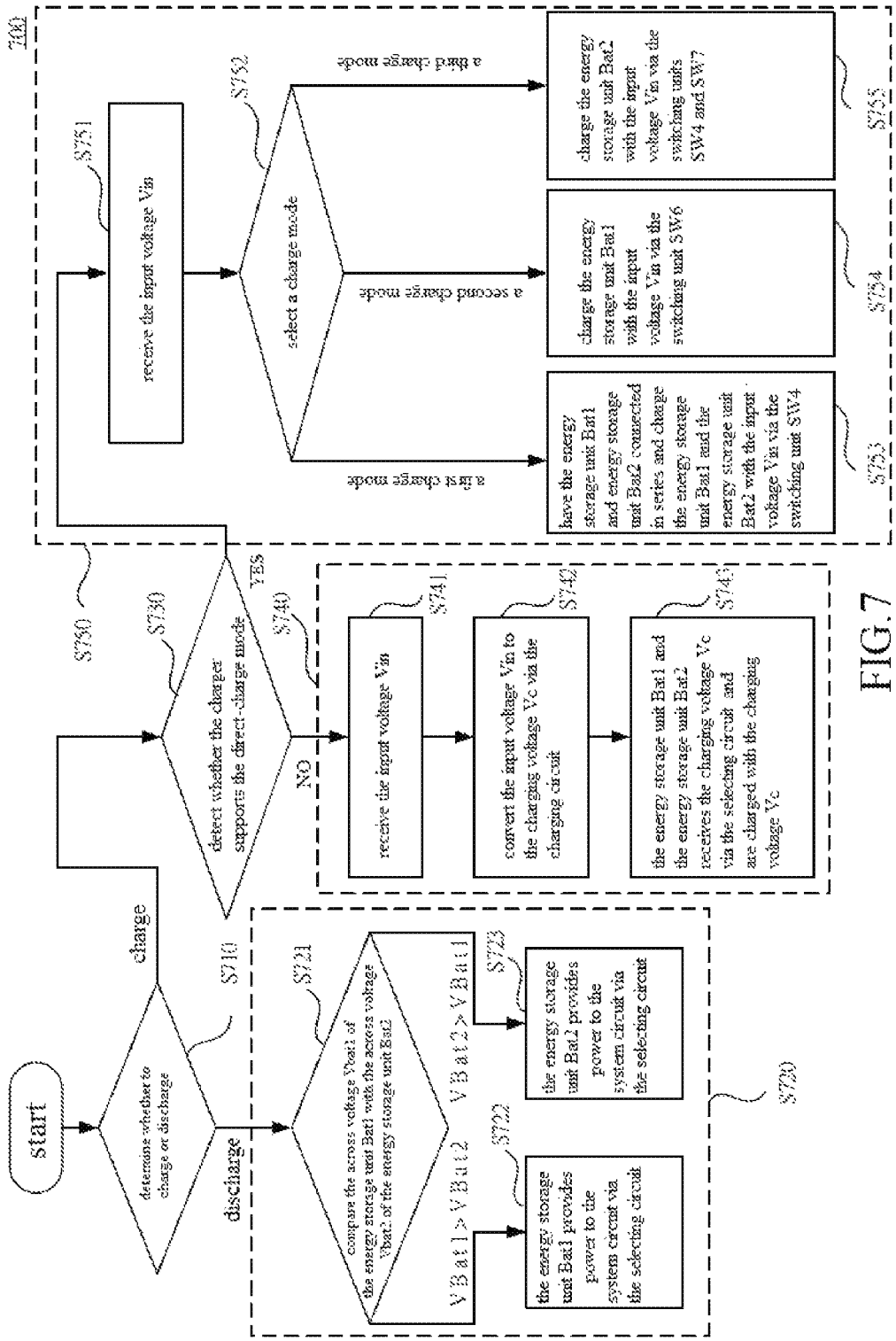
FIG. 7 is a flow chart of a charging and discharging method in an embodiment.

Please refer to FIG. 7. FIG. 7 is a flow chart of a charging and discharging method 700 in an embodiment. A charging and discharging method 700 is described by reference to the embodiments in FIG. 1 to FIG. 6, which is not limited herein. As shown in FIG. 7, the charging and discharging method 700 includes steps S710, S720, S730, S740 and S750.

In the step S710, the charging-discharging module of the energy storage unit 100 determines whether to charge or discharge according to the levels of the energy storage units Bat1 and Bat2.

When the charging-discharging module of the energy storage unit 100 determines to operate the discharge operation, the charging-discharging module of the energy storage unit 100 enters the discharge mode in the step S720. The step S720 includes steps S721, S722 and S723. In the step S721, in the discharge mode, the charging-discharging module of the energy storage unit 100 compares the across voltage Vbat1 of the energy storage unit Bat1 with the across voltage Vbat2 of the energy storage unit Bat2.

When the across voltage Vbat1 of the energy storage unit Bat1 is larger than the across voltage Vbat2 of the energy storage unit Bat2, step S722 is performed. In the step S722, the charging-discharging module of the energy storage unit 100 turns off the switching unit SW1 via the processing unit 140 to allow the energy storage unit Bat1 to provide power to the system circuit via the selecting circuit 120. In an embodiment, the step S722 further includes that the charging-discharging module of the energy storage unit 100 turns on the switching unit SW2 and to turn off the switching unit SW3 via the controller 122 of the selecting circuit 120 to allow the energy storage unit Bat1 to provide power to the system circuit via the selecting circuit 120.

When the across voltage Vbat2 of the energy storage unit Bat2 is larger than the across voltage Vbat1 of the energy storage unit Bat1, the step S723 is performed. In the step S723, the charging-discharging module of the energy storage unit 100 turns on the switching unit SW1 via the processing unit 140 to allow the energy storage unit Bat2 to provide power to the system circuit via the selecting circuit 120. In an embodiment, the step S723 further includes that the charging-discharging module of the energy storage unit 100 turns on the switching unit SW3 and turn off the switching unit SW2 via the controller 122 of the selecting circuit 120 to allow the energy storage unit Bat2 to provide power to the system circuit via the selecting circuit 120.

When the charging-discharging module of the energy storage unit 100 determines to operate the charge operation, the step S730 is performed. In the step S730, the charging-discharging module of the energy storage unit 100 detects whether the charger supports the direct-charge mode. When the charger does not support the direct-charge mode, the normal charge mode in step S740 is performed.

The step S740 includes steps S741, S742 and S743. In the step S741, the charging-discharging module of the energy storage unit 100 receives the input voltage Vin from the charger. In step S742, the charging-discharging module of the energy storage unit 100 converts the input voltage Vin to the charging voltage Vc via the charging circuit 160. In step S743, the charging-discharging module of the energy storage unit 100 turns on or turns off the switching unit SW1 via the processing unit 140. The energy storage unit Bat1 and the energy storage unit Bat2 receives the charging voltage Vc via the selecting circuit 120 and are charged with the charging voltage Vc.

When the charger supports the direct-charge mode, the direct-charge mode in the step S750 is performed. The step S750 includes steps S751, S752, S753, S754 and S755. In the step S751, the charging-discharging module of the energy storage unit 100 receives the input voltage Vin. In the step S752, the charging-discharging module of the energy storage unit 100 selects a charge mode according to the across voltage Vbat1 of the energy storage unit Bat1 and the across voltage Vbat2 of the energy storage unit Bat2.

In an embodiment, the charging-discharging module of the energy storage unit 100 is preset to select the first charge mode in the step S753. When the across voltage Vbat2 of the energy storage unit Bat2 minus the across voltage Vbat1 of the energy storage unit Bat1 is larger than the first preset value, the charging-discharging module of the energy storage unit 100 is switched from the first charge mode to the second charge mode of the step S754 via the processing unit 140. When the across voltage Vbat1 of the energy storage unit Bat1 minus the across voltage Vbat2 of the energy storage unit Bat2 is larger than the second preset value, the charging-discharging module of the energy storage unit 100 is switched from the first charge mode to the third charge mode of the step S755 via the processing unit 140.

In the first charge mode in step S753, the charging-discharging module of the energy storage unit 100 turns on the switching unit SW5 to make the energy storage unit Bat1 and energy storage unit Bat2 in series connection. The charging-discharging module of the energy storage unit 100 turns on the switching unit SW4 to charge the energy storage unit Bat1 and the energy storage unit Bat2 with the input voltage Vin via the switching unit SW4. In an embodiment, the step S753 further includes that the selecting circuit 120 conducts the energy storage unit Bat1 to the system circuit to allow the energy storage unit Bat1 to supply power to the system circuit.

In the second charge mode in step S754, the charging-discharging module of the energy storage unit 100 turns off the switching unit SW5 and turns on the switching unit SW6 via the processing unit 140 to charge the energy storage unit Bat1 with the input voltage Vin via the switching unit SW6. In an embodiment, the step S754 further includes that processing unit 140 turns on the switching unit SW1 to allow the energy storage unit Bat2 to supply power to the system circuit via the selecting circuit 120.

In the third charge mode in the step S755, the charging-discharging module of the energy storage unit 100 turns off the switching unit SW5 and turns on the switching units SW4 and SW7 via the processing unit 140 to charge the energy storage unit Bat2 with the input voltage Vin via the switching units SW4 and SW7. In an embodiment, the step S755 further includes that the processing unit 140 turns off the switching unit SW1 to allow the energy storage unit Bat1 to supply power to the system circuit via the selecting circuit 120.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A charging-discharging module of the energy storage unit, comprising:

a first energy storage unit;
a second energy storage unit;
a first switching unit electrically connected to a first terminal of the second energy storage unit;
a selecting circuit electrically connected to a first terminal of the first energy storage unit and the first switching unit to selectively conduct the first energy storage unit or the second energy storage unit to a system circuit;
an input terminal configured to receive an input voltage; and
a charging circuit electrically connected to the selecting circuit and the system circuit to convert the input voltage to a charging voltage; and
a processing unit electrically connected to the first switching unit;
a second switching unit electrically connected between the input terminal and the first terminal of the second energy storage unit;
a third switching unit electrically connected between a second terminal of the second energy storage unit and the first terminal of the first energy storage unit; and
a fourth switching unit electrically connected between the input terminal and the first terminal of the first energy storage unit,
wherein in a normal charge mode, the processing unit is configured to turn on or off the first switching unit to selectively make the first energy storage unit or the second energy storage unit charged with the charging voltage via the selecting circuit,
wherein in a discharge mode, when an across voltage of the first energy storage unit is larger than the across voltage of the second energy storage unit, the processing unit is configured to turn off the first switching unit to allow the first energy storage unit to supply power to the system circuit when the across voltage of the second energy storage unit is larger than the across voltage of the first energy storage unit, the processing unit is configured to turn on the first switching unit to allow the second energy storage unit to supply power to the system circuit,
wherein in a first charge mode, the third switching unit is turned on to make the first energy storage unit and the second energy storage unit in series connection, the second switching unit is turned on to make the first energy storage unit and the second energy storage unit charged with the input voltage via the second switching unit,
wherein in a second charge mode, the processing unit is configured to turn off the third switching unit and turn on the fourth switching unit to make the first energy storage unit charged with the input voltage via the fourth switching unit,
wherein in the second charge mode, the processing unit is configured to turn on the first switching unit to allow the second energy storage unit to supply power to the system circuit via the selecting circuit.

2. The charging-discharging module of the energy storage unit according to claim 1, wherein the selecting circuit includes:
a sixth switching unit electrically connected between the first energy storage unit and the system circuit;
a seventh switching unit electrically connected between the second energy storage unit and the system circuit; and
a controller electrically connected to the sixth switching unit and the seventh switching unit, in the discharge mode, when the across voltage of the first energy storage unit is larger than the across voltage of the second energy storage unit, the controller is configured to turn on the sixth switching unit and turn off the seventh switching unit; when the across voltage of the second energy storage unit is larger than the across voltage of the first energy storage unit, the controller is configured to turn on the seventh switching unit and turn off the sixth switching unit.

3. The charging-discharging module of the energy storage unit according to claim 1, wherein in the first charge mode, the selecting circuit is configured to conduct the first energy storage unit to the system circuit to allow the first energy storage unit to supply power to the system circuit.

4. A charging and discharging method, adapted to a charging-discharging module of an energy storage unit, the method comprising:
receiving an input voltage from a charger when the charging-discharging module of the energy storage unit is in a normal charge mode;
converting the input voltage to a charging voltage via a charging circuit;
when the charging-discharging module of the energy storage unit is in the normal charge mode, turning on or turning off a first switching unit via a processing unit to selectively charge a first energy storage unit and a second energy storage unit with the charging voltage via a selecting circuit;
comparing an across voltage of the first energy storage unit with an across voltage of the second energy storage unit in a discharge mode of the charging-discharging module of the energy storage unit;
turning off the first switching unit via the processing unit to allow the first energy storage unit to supply power to a system circuit via the selecting circuit, when the across voltage of the first energy storage unit is larger than the across voltage of the second energy storage unit;
turning on the first switching unit via the processing unit to allow the second energy storage unit to supply power to the system circuit via the selecting circuit, when the across voltage of the second energy storage unit is larger than the across voltage of the first energy storage unit;
detecting whether the charger supports a direct-charge mode;
receiving the input voltage when the charger supports the direct-charge mode;
turning on a second switching unit to make the first energy storage unit and the second energy storage unit charged with the input voltage via the second switching unit in a first charge mode of the direct-charge modes, and turning on a third switching unit to make the first energy storage unit and the second energy storage unit in series connection;
switching the charging-discharging module of the energy storage unit from the first charge mode to a second charge mode via the processing unit when the across voltage of the second energy storage unit minus the across voltage of the first energy storage unit is larger than a first preset value;
turning off the third switching unit and turning on a fourth switching unit via the processing unit to make the first energy storage unit charged with the input voltage via the fourth switching unit in the second charge mode; and turning on the first switching unit via the processing unit to allow the second energy storage unit to supply power to the system circuit via the selecting circuit in the second charge mode.

5. The charging-discharging module of the energy storage unit according to claim 1, further including:
a fifth switching unit electrically connected between the second terminal of the second energy storage unit and a ground terminal;
wherein in a third charge mode, the processing unit is configured to turn off the third switching unit and turn on the second switching unit and the fifth switching unit to make the second energy storage unit charged with the input voltage via the second switching unit and the fifth switching unit.

6. The charging-discharging module of the energy storage unit according to claim 5, wherein in the third charge mode, the processing unit is configured to turn off the first switching unit to allow the first energy storage unit to supply power to the system circuit via the selecting circuit.

7. The charging-discharging module of the energy storage unit according to claim 5, wherein when the first or the second energy storage unit is charged and the across voltage of the second energy storage unit minus the across voltage of the first energy storage unit is larger than a first preset value, the processing unit is configured to switch from the first charge mode to the second charge mode; and when the across voltage of the first energy storage unit minus the across voltage of the second energy storage unit is larger than a second preset value, the processing unit is configured to switch from the first charge mode to the third charge mode.

8. The charging and discharging method according to claim 4, further including:
turning on a sixth switching unit of the selecting circuit and turning off a seventh switching unit of the selecting circuit via a controller of the selecting circuit to allow the first energy storage unit to supply power to the system circuit via the selecting circuit when the across voltage of the first energy storage unit is larger than the across voltage of the second energy storage unit in the discharge mode; and
turning on the seventh switching unit and turning off the sixth switching unit via the controller to allow the second energy storage unit to supply power to the system circuit via the selecting circuit when the across voltage of the second energy storage unit is larger than the across voltage of the first energy storage unit.

9. The charging and discharging method according to claim 4, further comprising:
conducting the first energy storage unit to the system circuit via the selecting circuit to allow the first energy storage unit to supply power to the system circuit in the first charge mode.

10. The charging and discharging method according to claim 4, further comprising:
switching the charging-discharging module of the energy storage unit from the first charge mode to a third charge mode via the processing unit when the across voltage of the first energy storage unit minus the across voltage of the second energy storage unit is larger than a second preset value; and
turning off the third switching unit and turning on the second switching unit and a fifth switching unit via the processing unit to make the second energy storage unit charged with the input voltage via the second switching unit and the fifth switching unit, in the third charge mode.

11. The charging and discharging method according to claim 10, further comprising:
turning off the first switching unit via the processing unit to allow the first energy storage unit to supply power to the system circuit via the selecting circuit, in the third charge mode.

* * * * *